United States Patent
Le et al.

(10) Patent No.: US 12,120,073 B2
(45) Date of Patent: *Oct. 15, 2024

(54) SYSTEMS AND METHODS FOR GENERATING DYNAMIC CONVERSATIONAL RESPONSES USING ENSEMBLE PREDICTION BASED ON A PLURALITY OF MACHINE LEARNING MODELS

(71) Applicant: Capital One Services, LLC, McLean, VA (US)

(72) Inventors: Minh Le, Bentonville, AR (US); Erik Mueller, Chevy Chase, MD (US); Rui Zhang, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,385

(22) Filed: Apr. 21, 2023

(65) Prior Publication Data

US 2023/0262010 A1 Aug. 17, 2023

Related U.S. Application Data

(63) Continuation of application No. 17/811,063, filed on Jul. 6, 2022, now Pat. No. 11,677,693, which is a continuation of application No. 17/029,787, filed on Sep. 23, 2020, now Pat. No. 11,405,337.

(51) Int. Cl.
*H04L 51/02* (2022.01)
*G06F 17/18* (2006.01)
*G06N 3/045* (2023.01)
*G06N 20/20* (2019.01)

(52) U.S. Cl.
CPC .............. *H04L 51/02* (2013.01); *G06F 17/18* (2013.01); *G06N 3/045* (2023.01); *G06N 20/20* (2019.01)

(58) Field of Classification Search
CPC ........ H04L 51/02; G06N 3/045; G06N 3/044; G06N 20/20; G06F 17/18
See application file for complete search history.

(56) References Cited

U.S. PATENT DOCUMENTS

| | | | | |
|---|---|---|---|---|
| 2013/0066886 A1* | 3/2013 | Bagchi | ................ | G06F 16/3329 707/E17.071 |
| 2018/0349817 A1* | 12/2018 | Goel | ....................... | G06F 30/13 |
| 2019/0156198 A1* | 5/2019 | Mars | ....................... | G06Q 40/02 |
| 2021/0029137 A1* | 1/2021 | Wright | .................... | H04L 63/08 |
| 2021/0141862 A1* | 5/2021 | Huang | ................... | G06N 3/044 |
| 2021/0264025 A1* | 8/2021 | Givental | ............... | G06F 18/285 |
| 2021/0406478 A1* | 12/2021 | Klein | ...................... | G06N 3/045 |
| 2023/0044102 A1* | 2/2023 | Anderson | .............. | G06N 20/20 |

* cited by examiner

*Primary Examiner* — Jungwon Chang
(74) *Attorney, Agent, or Firm* — Foley & Lardner LLP

(57) ABSTRACT

Methods and systems are described for generating dynamic interface options using machine learning models. The dynamic interface options may be generated in real time and reflect the likely goals and/or intents of a user. The machine learning model may provide these features by interpreting multi-modal feature inputs. For example, the machine learning model may include a first machine learning model, wherein the first machine learning model comprises a convolutional neural network, and a second machine learning model, wherein the second machine learning model performs a Weight of Evidence (WOE) analysis.

20 Claims, 5 Drawing Sheets

SYSTEMS AND METHODS FOR GENERATING DYNAMIC CONVERSATIONAL RESPONSES USING ENSEMBLE PREDICTION BASED ON A PLURALITY OF MACHINE LEARNING MODELS

CROSS-REFERENCE TO RELATED APPLICATION(S)

This application is a continuation of U.S. patent application Ser. No. 17/811,063, filed Jul. 6, 2022, which is a continuation of U.S. patent application Ser. No. 17/029,787, filed Sep. 23, 2020. The content of the foregoing applications is incorporated herein in its entirety by reference.

FIELD OF THE INVENTION

The invention relates to generating dynamic conversational responses using ensemble prediction based on a plurality of machine learning models.

BACKGROUND

In recent years, the amount and use of interactive programs has risen considerably. In tandem with this rise is the need to have human-like interactions and/or create applications that provide guidance and options for users. Additionally, in order to fulfill user-interaction requirements, these applications need to be helpful, and thus respond intelligently by providing relevant responses to user inputs, whether these inputs are received via text, audio, or video input.

SUMMARY

Methods and systems are described herein for generating dynamic conversational responses. For example, dynamic interface options may facilitate an interactive exchange with users. The interactive exchange may include the system responding to one or more user actions (or inactions) and/or predicting responses prior to receiving a user action. In order to maintain the device interface session during the exchange, the system must generate responses that are both timely and pertinent (e.g., in a dynamic fashion). This requires the system to determine both quickly (i.e., in real-time or near real-time) and accurately the intent, goal, or motivation behind a user input. These user inputs or actions may take various forms including speech commands, textual inputs, responses to system queries, and/or other user actions (e.g., logging into a mobile application of the system). In each case, the system must aggregate information about the user action, information about the user, and/or other circumstances related to the user action (e.g., time of day, previous user actions, current account settings, etc.) in order to determine a likely intent of the user.

In order to determine the likely intent and generate conversational responses using ensemble prediction based on a plurality of machine learning models that is both timely and pertinent, the methods and systems herein use one or more machine learning models. For example, the methods and system may use machine learning models in which multi-modal information about the user and/or information about user actions is used to generate feature inputs for machine learning models. These feature inputs are then input into machine learning models to generate dynamic interface options. For example, the feature inputs may include information about the user action, information about the user, and/or other circumstances related to the user action (e.g., time of day, previous user actions, current account settings, etc.). The feature inputs (e.g., vectors of data) may express the information quantitatively or qualitatively.

In particular, the system may generate feature inputs based on recent user interactions such as what feature or web pages a user recently visited. However, basing recommendations on this type (and/or only one time of information) is problematic. Most applications only have limited features (e.g., a help feature, a contact information feature, etc.) or web pages (e.g., a home page, user account page, etc.); therefore anticipating a user's intent based on his/her selection of features and/or web pages is difficult as users with multiple intents necessarily use the same features and/or web pages. To overcome this technical problem in computer systems, the system accesses and trains its machine learning models on multiple types of data (e.g., multi-modal data). For example, the system may generate a first feature input based on the metadata related to a user interface image, and the system may generate a second feature input based on time-dependent user account information. By using multi-modal feature inputs, and training separate machine learning models on each type, the system prevents bias from one feature input from affecting the other.

For example, the system may use a first machine learning model, wherein the first machine learning model comprises a convolutional neural network, to process a feature input based on the metadata related to a user interface image. The system may also use a second machine learning model, wherein the second machine learning model performs a classification on the time-dependent user account information. Additionally, the second machine learning model may perform a Weight of Evidence (WOE) analysis on the time-dependent user account information. For example, the system may perform a WOE analysis as a preprocessing step, the output of which is fed into a subsequent classification model. Notably, the use of the convolutional neural network for the first machine learning model preserves relationship of pixels in the image, enabling better feature recognition, which is relevant to image processing and recognition. The use of the WOE analysis for the second machine learning model allows the system to detect outliers within the data and predict the outcome of events given varying degrees of knowledge of other variables.

Additionally, the system may use the outputs of these models as inputs to an ensemble function. The system may then use the output of the ensemble function (e.g., another machine learning model) to generate conversational responses. In addition to being better predictors of the intent of the user, the ensemble function allows for modularity (e.g., enhanced prediction performance without modifying existing models), simplicity (e.g., stacking is a light learning block, which could be implemented as non-deep learning or a narrow and thin neural network, and expandability (e.g., new machine learning models and new input data types can be integrated into the system easily).

In some aspects, the method or system may generate dynamic conversational responses using ensemble prediction based on a plurality of machine learning models. For example, the system may receive a first user action during a conversational interaction with a user interface. The system may determine, based on the first user action, a first feature input for a first machine learning model, a second feature input for a second machine learning model, and a third feature input for a third machine learning model, wherein each of the first feature input, the second feature input, and the third features input is based on a respective data source. The system input the first feature input into the first machine learning model, the second feature input into the second machine learning model, and the third feature input into the third machine learning model to generate a first output from the first machine learning model, a second output from the second machine learning model, and a third output from the third machine learning model. The system may input the first output, the second output, and the third output into a fourth machine learning model to generate a fourth output. The system may determine an aggregate measure of performance across all possible classification thresholds for the first machine learning model, the second machine learning model, the third machine learning model, and the fourth machine learning model. The system may determine that the fourth machine learning model has the highest aggregate measure of performance. The system, in response to determining that the fourth machine learning model has the highest aggregate measure of performance, selecting the fourth output for use in generating a dynamic conversational response from a plurality of dynamic conversational responses. The system generating, at the user interface, the dynamic conversational response during the conversational interaction.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the image clearly dictates otherwise. In addition, as used in the specification and the claims, the term "or" means "and/or" unless the image clearly dictates otherwise. Additionally, as used in the specification "a portion," refers to a part of, or the entirety of (i.e., the entire portion), a given item (e.g., data) unless the image clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
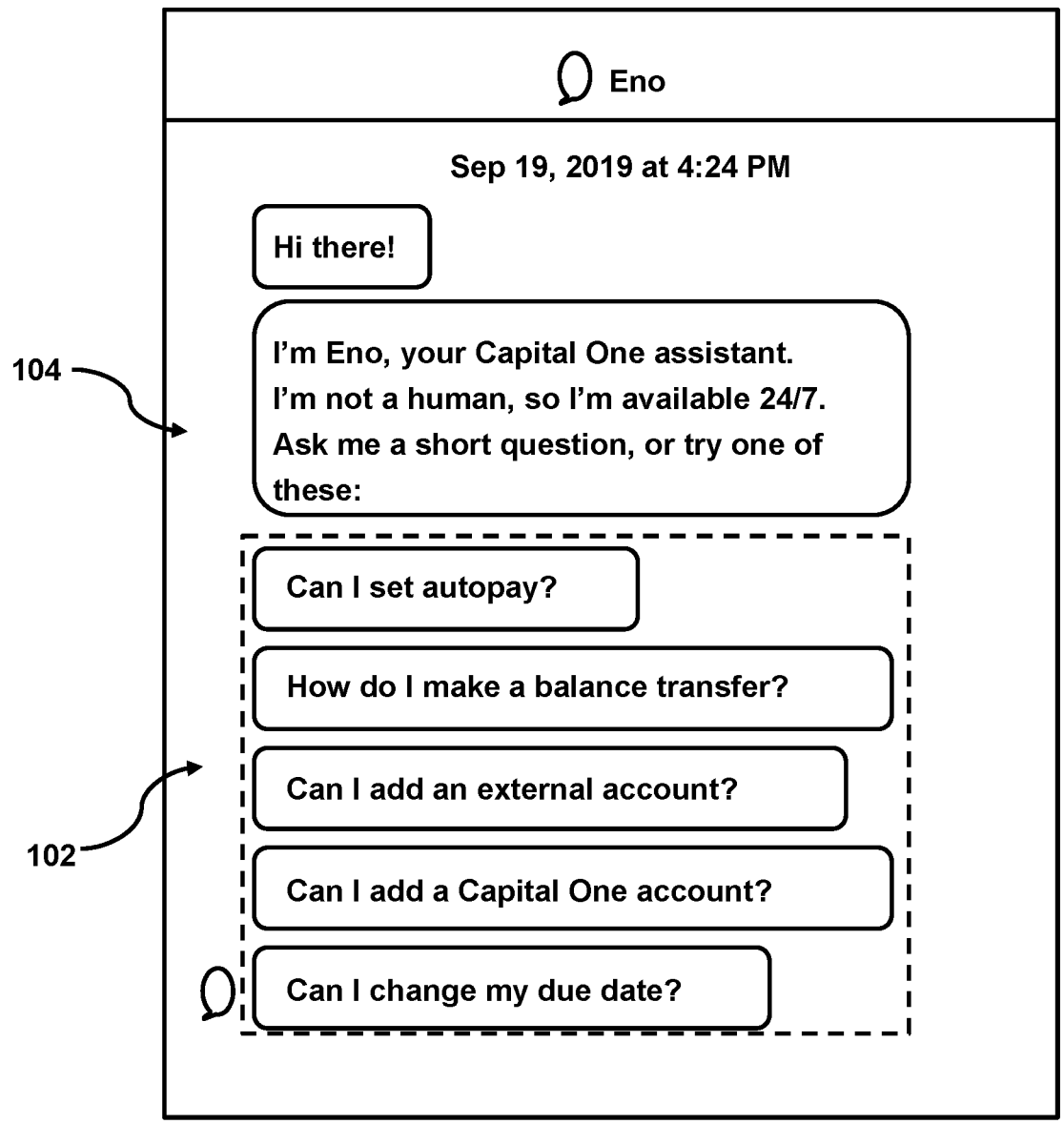
FIG. 1 shows an illustrative user interface for presenting dynamic conversational responses using ensemble machine learning models, in accordance with one or more embodiments.

FIG. 1 shows an illustrative user interface for presenting dynamic conversational responses using ensemble machine learning models, in accordance with one or more embodiments. For example, FIG. 1 shows user interface 100. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.)

In order to maintain the conversational interaction, the system may need to generate response (e.g., conversational response) dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100, inputting a query (e.g., query 104) into user interface 100, and/or a prior action (or lack thereof) by a user to a prior response generated by the system, the system may take one or more steps to generate dynamic conversational responses. These steps may include retrieving data about the user, retrieving data from other sources, monitoring user actions, and/or other steps in order to generate a feature input (e.g., as discussed below).

For example, FIG. 1 shows user interface 100, which may be presented by an application or web pages. The system may monitor the interfaces interacted with the user to generate a first feature input. For example, the system may receive user interface image data, which may include data that describes an image currently or previously found in a user interface and/or characteristic, circumstances, and/or users related to the user interface. For example, the system may monitor, and user interface image data may include, user interactions in the user interfaces (e.g., user interface 100) during a device interface session with the user. The device interface session may include a back-and-forth exchange of ideas and information between the system and the user. The device interface session may proceed through one or more mediums (e.g., text, video, audio, etc.). For example, the system may generate data points such as demographic segments (age, gender, profession, household income), temporal aspects (time of day, season, events), geolocation, and other behavioral data during a device session into order to determine insights into the specifics of the context of usage of a particular digital product or service. For example, when a user engages with a device, the user may multitask between various applications and/or websites. The user may enter and exit device sessions and/or may perform user actions during these device sessions. Each of these engagements with the device may comprise a device session.

For example, the system may include different supervised and unsupervised machine learning models and human devised rules that may reflect accumulated domain expertise. Specifically, the system may include non-deep Learning classification models that may include, but are not limited to, logistic regression and Naïve Bayesian. The system may include deep learning models that may include neural factorization machines, deep and wide, and multi-modal models. The system may also include sets of human-written rules.

For example, the system may include a recommendation engine which recommends quick replies (QRs), or dynamic conversational responses. For example, the system may receive an output from a machine learning model (e.g., the fourth machine learning model may comprise an ensemble function that is trained on outputs of other machine learning models such as a first machine learning model, wherein the first machine learning model comprises a first convolutional neural network that is trained on user interface image data, a second machine learning model, wherein the second machine learning model may perform a classification and/or a Weight of Evidence (WOE) analysis and may be trained on time-dependent user account information data, and a third machine learning model, wherein the third machine learning model comprises a second convolutional neural network that is trained on transaction data). For example, the system may perform a WOE analysis as a preprocessing step, the output of the WOE analysis may then be fed into a subsequent classification model.

As referred to herein, transaction data may include any data related to a transaction. For example, the record data may include a paper or electronic record containing information about the transaction, such as transaction amount, transaction number, transaction date and time, transaction type (deposits, withdrawal, purchase or refund), type of account being debited or credited, card number, identity of the card acceptor (e.g., merchant/source, including source address, identification or serial number, and/or terminal (e.g., name from which the terminal operates)). For example, an exemplary record data for a transaction may include:

Transaction ID: 01234
Timestamp: 1/1/2020 01:30:55 AM UTC
Price: $57.98
Payment Currency: USD
Card Present: True
Merchant ID: 12345

In some embodiments, transaction data may include other information as well. For example, information about a source (e.g., address) may be updated and/or correspond to a particular location, corporate headquarters, or other address for all transactions with the source. Likewise, time stamp information may be transmitted in different formats (or correspond to different time zones). Payment information may have slight variations due to fees charged by different system components. In such cases, the system may reconstitute the original charge made by the user based on exchange fee information.

In some embodiments, the transaction data may not be human-readable. For example, network name data may not be human readable. That is, network name data is generated along with the proprietary security algorithms used by different system components, and this network name data may comprise a string of alphanumeric characters and/or other symbols that is used by each individual system component. The network name may be routinely encrypted, decrypted, and/or subject to different proprietary algorithms for generating and translating data such that its original data value (e.g., a name of a source if the value was even originally based on the name of the source) may be irretrievable. As a benefit to human users, some credit card issuers and banks may cleanse this data in order to make it human readable. That is, the credit card issuers and/or banks may apply a proprietary algorithm to make network name or other source data more human readable.

In some embodiments, user interface image data may comprise information that represents the combination of linguistic and non-linguistic data models (e.g., as described below in relation to FIG. 3). For example, user interface image data may comprise a matrix of values. For example, the system may receive user action data in the form of metadata. Metadata may include pageview information and text path and page structure data. For example, a pageview (or pageview hit, page tracking hit) may be an instance of a page being loaded (or reloaded) in a browser. Text path information may indicate line, shapes, and/or graphic elements that text follows. Metadata may also include information on how the application and/or the website is set up, i.e., how the individual subpages are linked to one another. The system may then generate a feature input based on this information.

For example, metadata may represent the user action data that is detected by the system prior to the system generating one or more dynamic conversational responses. For example, as discussed above in relation to FIG. 1 above, the system may retrieve data about a current and/or previous user interaction with the application, webpage or other feature. Additionally or alternatively, the system may retrieve other information (e.g., time-dependent user information and/or transaction data). The system may then create a vector of data values that corresponds to this initial metadata. The system may represent this vector of data as a matrix and/or may perform matrix operations to pre-process this data. This pre-processing may include applying weights to individual values (or representations of a collection of values (e.g., corresponding to a region or pageview) in the matrix as well as identifying importance of given values (e.g., using pooling and/or attention layers).

Figure 2:
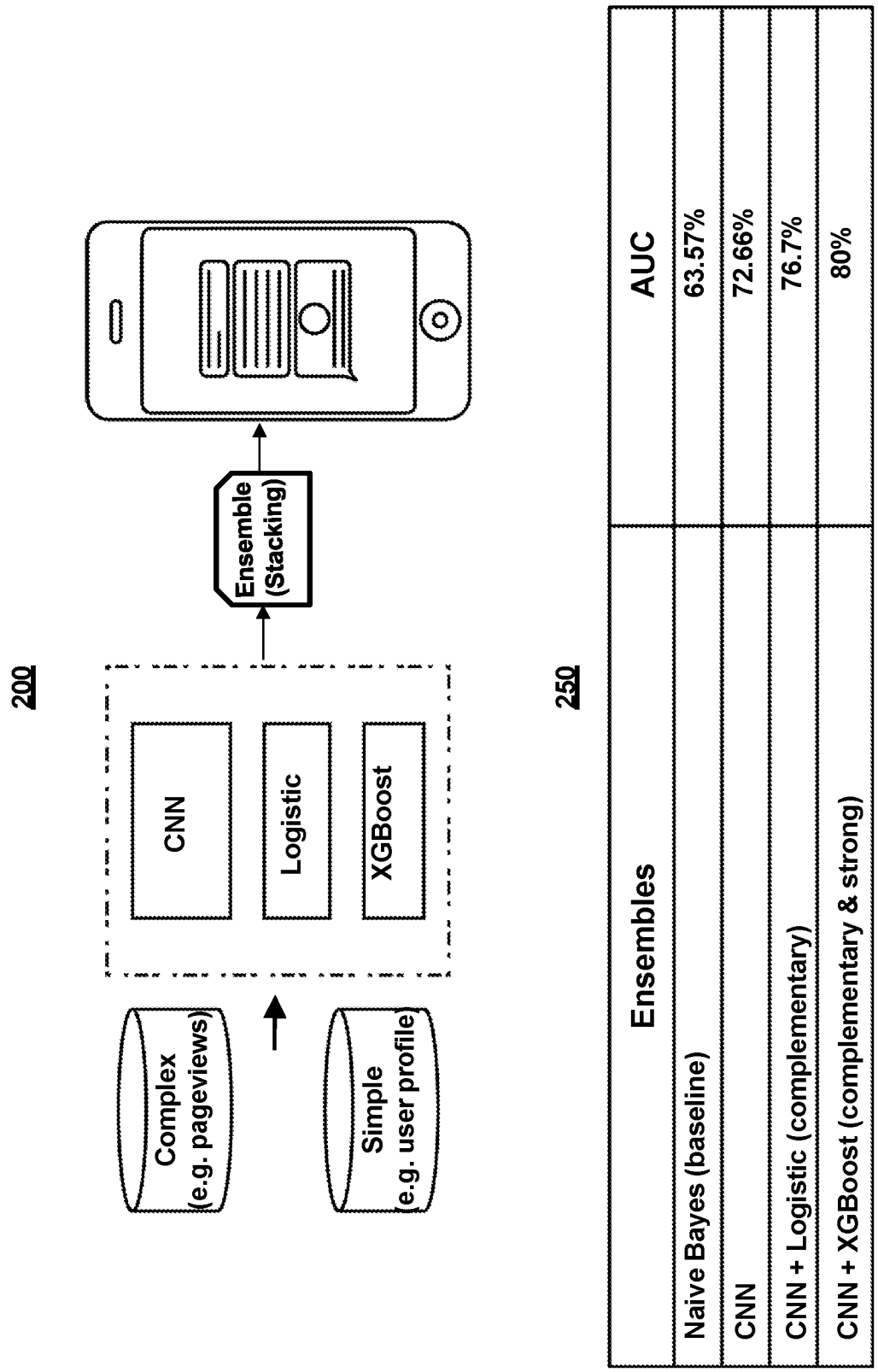
FIG. 2 shows an illustrative system architecture for generating dynamic interface options using machine learning models featuring multi-modal feature inputs in accordance with one or more embodiments.

FIG. 2 shows an illustrative system architecture for generating dynamic interface options using machine learning models featuring multi-modal feature inputs in accordance with one or more embodiments. For example, FIG. 2 includes system 200 and chart 250. System 200 comprises an ensemble of neural networks and non-neural networks. Chart 250 includes the benefits achieved in correctly identifying an intent of a user using the ensemble of neural networks and non-neural networks.

For example, as shown in system 200, inputs (e.g., complex data such as pageviews and other data received via active monitoring and simple data such as user profile) may be inputted into a plurality of machine learning models. The ensemble function may combine the outputs from multiple base models into a single score. For example, outputs from base-level models are used as input features which may be used to train the ensemble function. In some embodiments, the ensemble function may be a linear combination of the base model scores.

As shown in chart 250, adding strong, complementary models to the ensemble improves performance. For example, the complementary models have a higher area under the curve ("AUC") percentage in a receiver operating characteristic ("ROC") curve. The ROC curve is a graph showing the performance of a classification model at all classification thresholds. This curve plots two parameters: True Positive Rate ("TPR") and False Positive Rate ("FPR"). For example, TPR is the probability that an actual positive will test positive. FPR the probability that an actual negative will test positive. For example, a ROC curve plots TPR vs. FPR at different classification thresholds. Lowering the classification threshold classifies more items as positive, thus increasing both False Positives and True Positives. The AUC measures the entire two-dimensional area underneath the entire ROC curve from (0,0) to (1,1). AUC provides an aggregate measure of performance across all possible classification thresholds. One way of interpreting AUC is as the probability that the model ranks a random positive example more highly than a random negative example.

In some embodiments, the system may determine an aggregate measure of performance across all possible classification thresholds for the base models and the ensemble model. The system may also select which model is used to generate dynamic conversational response based on the AUC (e.g., the aggregate measure of performance across all possible classification thresholds). For example, the system may use the output of the ensemble function or one of the base models based on the highest AUC. The system may also use the respective AUC of the base models to determine if a base model should be used to generate inputs into the ensemble function (e.g., to determine whether or not the model is complimentary). For example, the system may use a low AUC attributed with a first machine learning model to replace it with a fifth machine learning model. For example, the system may determine that a Deep Learning model contributes most of the performance as the Deep Learning model's stand alone performance is the highest, higher than Naive Bayes models with both text and numerical data. The numerical data based model may be implemented with a non-Deep Learning (e.g., Lasso L2-regulated regression). If its stand alone performance is not high, the system may replace it. However, the diversity between the numerical data based model and the text data based model may add a notable improvement. Accordingly, the system may keep these models. In contrast, if a model has low stand alone performance or if adding this model to the ensemble function adds little value and introduces additional processing costs, the system may remove this model.

Figure 3:
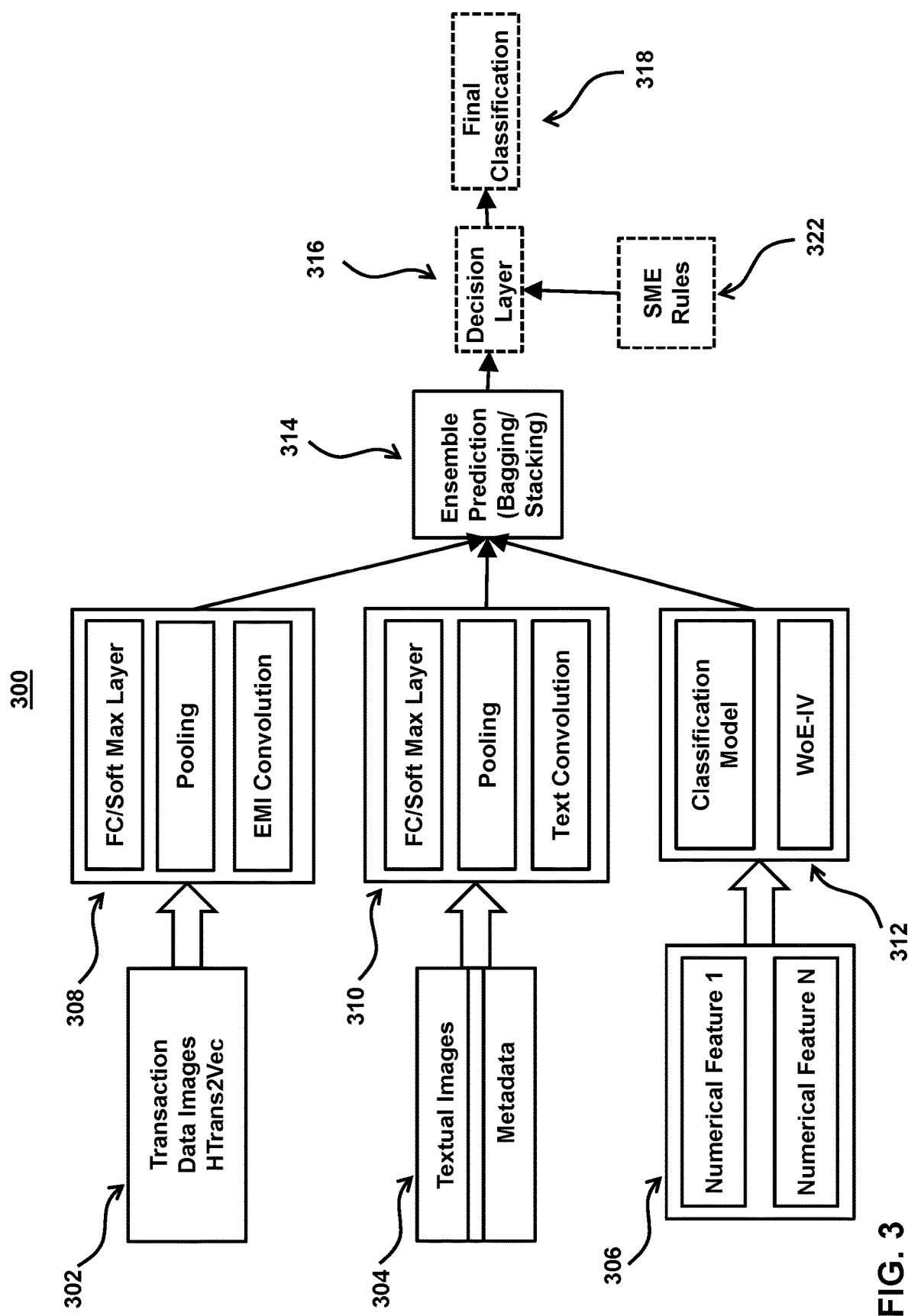
FIG. 3 shows an illustrative system architecture for generating dynamic interface options using machine learning models featuring multi-modal feature inputs in accordance with one or more embodiments.

FIG. 3 shows an illustrative system architecture for generating dynamic interface options using machine learning models featuring multi-modal feature inputs in accordance with one or more embodiments. System 300 may receive user action data based on user actions with user interfaces (e.g., user interface 100 (FIG. 1)) during a device session. The user action data (e.g., data 304) may include metadata, which may be metadata related to user interfaces (e.g., user interface 100 (FIG. 1)). Metadata may include pageview information and text path and page structure data. For example, a pageview (or pageview hit, page tracking hit) may be an instance of a page being loaded (or reloaded) in a browser. Text path information may indicate line, shapes, and/or graphic elements that text follows. Metadata may also include information on how the application and/or the website is set up, i.e. how the individual subpages are linked to one another. The system may generate data 304 using image recognition and/or object recognition. For example, the system may determine a first user interface image corresponding to the first user action in the user interface. For example, the system may capture, user interface image data such as an image of a current user interface (and/or menus or features being accessed). The system may then apply computer vision techniques to determine metadata or a vector array corresponding to the image. For example, the system may employ computer vision tasks that include acquiring, processing, analyzing and understanding digital images, and extraction of high-dimensional data from the real world in order to produce numerical or symbolic information, e.g., in the forms of decisions. To understand the context of the image, the system may transform visual images into descriptions of data.

System 300 may also receive information, which may use a Bidirectional Encoder Representations from Transformers (BERT) language model for performing natural language processing. For example, the BERT model includes pre-training contextual representations including Semi-supervised Sequence Learning, Generative Pre-Training, ELMo, and ULMFit. Unlike previous models, BERT is a deeply bidirectional, unsupervised language representation, pre-trained using only a plain text corpus. Context-free models such as word2vec or GloVe generate a single word embedding representation for each word in the vocabulary, whereas BERT takes into account the context for each occurrence of a given word. For instance, whereas the vector for "running" will have the same word2vec vector representation for both of its occurrences in the sentences "He is running a company" and "He is running a marathon", BERT will provide a contextualized embedding that will be different according to the sentence. Accordingly, the system is better able to determine an intent of the user.

In some embodiments, the system may additionally or alternatively, use Embeddings from Language Models ("ELMo"). For example, ELMo is a deep contextualized word representation that models both (1) complex characteristics of word use (e.g., syntax and semantics), and (2) how these uses vary across linguistic contexts (i.e., to model polysemy). These word vectors may be learned functions of the internal states of a deep bidirectional language model (biLM), which may be pre-trained on a large text corpus. ELMOs may be easily added to existing models and significantly improve the state of the art across a broad range of challenging natural language processing problems, including question answering, textual entailment, and sentiment analysis.

In some embodiments, the system may additionally or alternatively, use Universal Language Model Fine-tuning ("ULMFiT"). ULMFiT is a transfer learning technique for use in natural language processing problems, including question answering, textual entailment, and sentiment analysis. ULMFiT may use a Long short-term memory ("LSTM") is an artificial recurrent neural network ("RNN") architecture. The LSTM may include a three layer architecture that includes: general domain language model pre-training; target task language model fine-tuning; and target task classifier fine-tuning.

System 300 may also use transfer learning. For example, transfer learning allows system 300 to deal with current scenarios (e.g., detecting user intent) by leveraging the already existing labeled data of some related task or domain. System 300 may store knowledge gained through other tasks and apply it to the current task. For example, system 300 may use transfer learning to re-fine information into fine-tuned BERT model information that is refined using internal data and/or data related to detecting user intent.

System 300 may then proceed to process this information in first model 310. First model 310 may include a convolutional neural network (CNN) that includes of an input layer and an output layer, as well as multiple hidden layers. The hidden layers of a CNN may include a series of convolutional layers that convolve with a multiplication or other dot product. First model 310 may use an activation function in a RELU layer (and/or LeakyRELU layer), and may subsequently comprise additional convolutions such as pooling layers, fully connected layers and normalization layers, referred to as hidden layers because their inputs and outputs are masked by the activation function and final convolution.

First model 310 may also include a softmax function or a normalized exponential function. The softmax function takes as input a vector z of K real numbers, and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0,1), and the components will add up to 1, so that they can be interpreted as probabilities. Furthermore, the larger input components will correspond to larger probabilities.

System 300 may also receive numerical data 306 (e.g., time-dependent user account information). Numerical data 306 is input in second model 312. Second model 312 may perform a classification on the time-dependent user account information. Additionally or alternatively, the second machine learning model may use WOE and information value (IV) data. WOE describes the relationship between a predictor and a binary dependent variable. IV is the measurement of that relationship's power. Based on its role, IV can be used as a base for attributes selection. For example, WOE helps to transform a continuous independent variable into a set of groups or bins based on similarity of dependent variable distribution i.e. number of events and non-events. For continuous independent variables, second model 312 first creates bins (categories/groups) for a continuous independent variable and then combine categories with similar WOE values and replace categories with WOE values. For categorical independent variables, second model 312 combines categories with similar WOE and then creates new categories of an independent variable with continuous WOE values. The system combines categories with similar WOE because the categories with similar WOE have almost same proportion of events and non-events. In other words, the behavior of both the categories is same.

System 300 also includes third model 308. Third model 308 may process transaction data 302. For example, transaction data 302 may include information about one or more transactions (e.g., between the user and one or more merchants). In some embodiments, data 302 may be configured as 2D-array of real numbers with max-censored number of rows and fixed number of columns. For example, the system may incorporate merchants' types/sectors hierarchy in addition to frequency and total amount into a feature input.

Third model 312 may include a convolutional neural network (CNN) that includes an input layer and an output layer, as well as multiple hidden layers. The hidden layers of a CNN may include of a series of convolutional layers that convolve with a multiplication or other dot product. Third model 312 may use an activation function in a RELU layer (and/or LeakyRELU layer), and may subsequently comprise additional convolutions such as pooling layers, fully connected layers and normalization layers, referred to as hidden layers because their inputs and outputs are masked by the activation function and final convolution.

Third model 312 may also include a softmax function or a normalized exponential function. The softmax function takes as input a vector z of K real numbers, and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0,1), and the components will add up to 1, so that they can be interpreted as probabilities. Furthermore, the larger input components will correspond to larger probabilities.

First model 310, second model 312, and third model 308 may receive inputs and generate outputs that are processed by fourth model 314. Fourth model 314 may then generate a final classification 318. Fourth model 314 may include ensemble prediction. For example, ensemble methods use multiple learning algorithms to obtain better predictive performance than could be obtained from any of the constituent learning algorithms alone. Unlike a statistical ensemble in statistical mechanics, which is usually infinite, a machine learning ensemble consists of only a concrete finite set of alternative models, but typically allows for much more flexible structure to exist among those alternatives. Additionally, the fourth model 314 may include bootstrap aggregating and stacking.

Bootstrap aggregating, often abbreviated as bagging, involves having each model in the ensemble vote with equal weight. In order to promote model variance, fourth model 314 trains each model in the ensemble using a randomly drawn subset of the training set. As an example, the random forest algorithm combines random decision trees with bagging to achieve very high classification accuracy. In bagging, the samples are generated in such a way that the samples are different from each other, however replacement is allowed. Stacking (sometimes called stacked generalization) involves training a learning algorithm to combine the predictions of several other learning algorithms. First, all of the other algorithms are trained using the available data, then a combiner algorithm is trained to make a final prediction using all the predictions of the other algorithms as additional inputs. If an arbitrary combiner algorithm is used, then stacking can theoretically represent any of the ensemble techniques described in this article, although, in practice, a logistic regression model is often used as the combiner. Stacking typically yields better performance than any single one of the trained models. It should be noted that in some embodiments first model 310, second model 312, third model 308, and fourth model 314 may be combined into or more models (e.g., may comprise a single model).

The output of fourth model 314 may then be input into decision layer 316. At decision layer 316, system 300 may rank potential responses (e.g. potential user intents) by probability, and select a number (e.g., a predetermined number of responses and/or all responses with a probability greater than a given threshold). In some embodiments, decision layer 316 may determine an aggregate measure of performance across all possible classification thresholds for the first machine learning model, the second machine learning model, the third machine learning model, and the fourth machine learning model. At decision layer 316, system 300 may determine the machine learning model with the highest aggregate measure of performance ("AUC"). In response to determining the machine learning model with the highest the aggregate measure of performance, system 300 may use that model's output for generating a dynamic conversational response from a plurality of dynamic conversational response. Additionally or alternatively, system 300 may determine the machine learning model that has the lowest the aggregate measure of performance and may replace that machine learning model with another.

Figure 4:
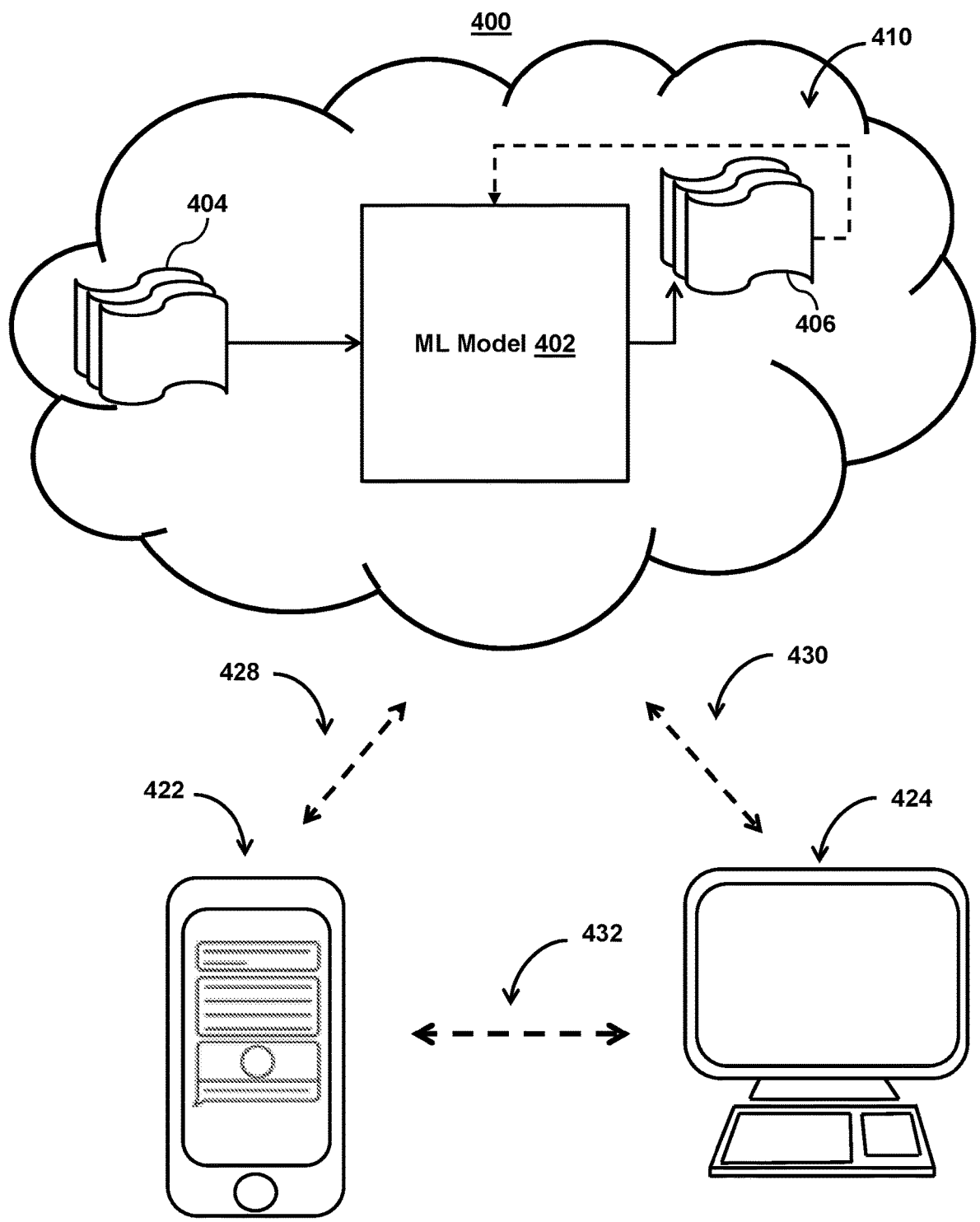
FIG. 4 is an illustrative system for generating dynamic interface options using machine learning models featuring multi-modal feature inputs, in accordance with one or more embodiments.

FIG. 4 is an illustrative system for generating dynamic interface options using machine learning models featuring multi-modal feature inputs, in accordance with one or more embodiments. For example, system 400 may represent the components used for generating dynamic interface options as shown in FIG. 1. As shown in FIG. 4, system 400 may include mobile device 422 and user terminal 424. While shown as a smartphone and personal computer, respectively, in FIG. 4, it should be noted that mobile device 422 and user terminal 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users, may, for instance, utilize one or more devices to interact with one another, one or more servers, or other components of system 400. It should be noted, that, while one or more operations are described herein as being performed by particular components of system 400, those operations may, in some embodiments, be performed by other components of system 400. As an example, while one or more operations are described herein as being performed by components of mobile device 422, those operations, may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., based on recommended contact strategies).

Additionally, as mobile device 422 and user terminal 424 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to generating dynamic interface options using machine learning models.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database configured to store user data for a user. For example, the database may include user data that the system has collected about the user through prior transactions. Alternatively, or additionally, the system may act as a clearing house for multiple sources of information about the user. Cloud components 410 may also include control circuitry configured to perform the various operations needed to generate recommendations. For example, the cloud components 410 may include cloud-based storage circuitry configured to store a first machine learning model, wherein the first machine learning model comprises a first convolutional neural network that is trained on user interface image data, a second machine learning model, wherein the second machine learning model may perform a classification and/or perform a Weight of Evidence (WOE) analysis, and which is trained on time-dependent user account information data, a third machine learning model, wherein the third machine learning model comprises a second convolutional neural network that is trained on transaction data, and a fourth machine learning model, wherein the fourth machine learning model comprises an ensemble function that is trained on outputs of the first machine learning model, the second machine learning model, and the third machine learning model. Cloud components 410 may also include cloud-based control circuitry configured to determine that the fourth machine learning model has the highest aggregate measure of performance, and in response to determining that the fourth machine learning model has the highest the aggregate measure of performance, select the fourth output for use in generating a dynamic conversational response from a plurality of dynamic conversational responses. Cloud components 410 may also include cloud-based input/output circuitry configured to generate, at the user interface, the dynamic conversational response during the conversational interaction.

Cloud components 410 includes machine learning model 402. Machine learning model 402 may take inputs 404 and provide outputs 406. The inputs may include multiple datasets such as a training dataset and a test dataset. Each of the plurality of datasets (e.g., inputs 404) may include data subsets related to user data, contact strategies, and results. In some embodiments, outputs 406 may be fed back to machine learning model 402 as input to train machine learning model 402 (e.g., alone or in conjunction with user indications of the accuracy of outputs 406, labels associated with the inputs, or with other reference feedback information). For example, the system may receive a first labeled feature input, wherein the first labeled feature input is labeled with a known dynamic interface option for the first labeled feature input. The system may then train the first machine learning model to classify the first labeled feature input with the known dynamic interface option.

In another embodiment, machine learning model 402 may update its configurations (e.g., weights, biases, or other parameters) based on the assessment of its prediction (e.g., outputs 406) and reference feedback information (e.g., user indication of accuracy, reference labels, or other information). In another embodiment, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

In some embodiments, machine learning model 402 may include an artificial neural network (e.g., as described in FIG. 4 below). In such embodiments, machine learning model 402 may include an input layer and one or more hidden layers. Each neural unit of machine learning model 402 may be connected with many other neural units of machine learning model 402. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Machine learning model 402 may be self-learning and trained, rather than explicitly programmed, and can perform significantly better in certain areas of problem solving, as compared to traditional computer programs. During training, an output layer of machine learning model 402 may correspond to a classification of machine learning model 402 and an input known to correspond to that classification may be input into an input layer of machine learning model 402 during training. During testing, an input without a known classification may be input into the input layer, and a determined classification may be output.

In some embodiments, machine learning model 402 may include multiple layers (e.g., where a signal path traverses from front layers to back layers). In some embodiments, back propagation techniques may be utilized by machine learning model 402 where forward stimulation is used to reset weights on the "front" neural units. In some embodiments, stimulation and inhibition for machine learning model 402 may be more free-flowing, with connections interacting in a more chaotic and complex fashion. During testing, an output layer of machine learning model 402 may indicate whether or not a given input corresponds to a classification of machine learning model 402.

In some embodiments, model 402 may predict a goal or intent of a user. This goal or intent may be selected from a plurality of goals and/or intents stored by the system. For example, the system may determine that users who ask different questions about payment have similar account information and digital activities. The system may further determine that the users tend to be different from those of users who have a one-off type request, such as lost card reports or travel notification. In some embodiments, the model (e.g., model 402) may automatically perform actions based on output 406. In some embodiments, the model (e.g., model 402) may not perform any actions on a user's account. The output of the model (e.g., model 402) is only used to decide which dynamic conversational responses to display to a user.

Figure 5:
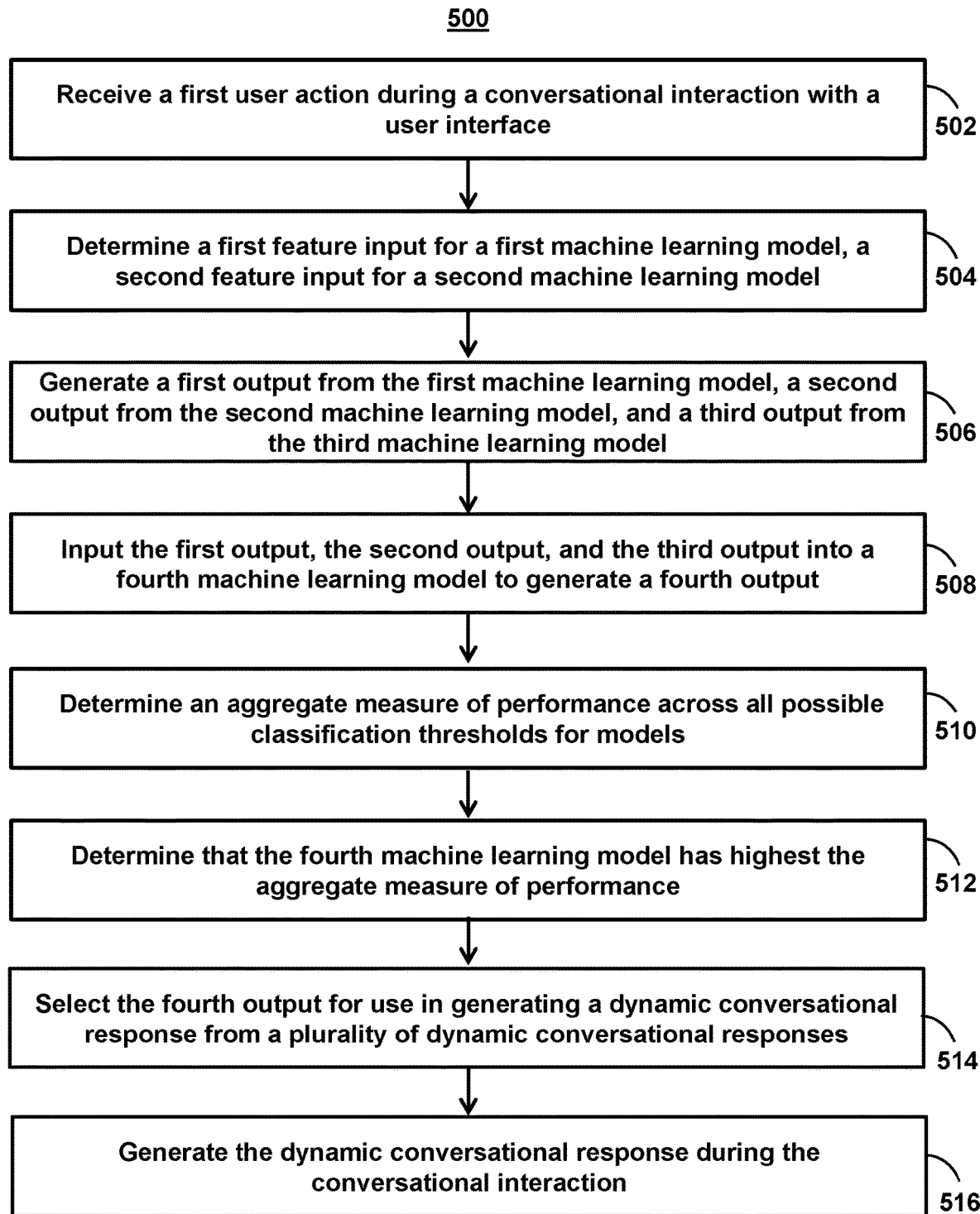
FIG. 5 shows a flowchart of the steps involved in generating user information for dynamic interface options, in accordance with one or more embodiments.

FIG. 5 shows a flowchart of the steps involved in generating user information for dynamic interface options, in accordance with one or more embodiments. For example, process 500 may represent the steps taken by one or more devices, as shown in FIGS. 1-3, when generating user information. For example, the dynamic interface option may comprise an option to pay a bill. In order to facilitate this action, the system may retrieve information about the user (e.g., login credentials) or information relevant to paying the bill (e.g., an amount due, a due date, a payment format, stored user credit card and account information). In another example, in some embodiments, a user may end a device interface session with an application that generates dynamic interface options (e.g., a mobile application). The user may then contact (e.g., via the same or a different platform) another user. The other user may (e.g., be a service representative associated with a provider of the application). In order to improve the device interface session between the first and second user, the system may provide recommendations to the second user about potential questions that the first user may have. Additionally or alternatively, the system may need to locate information in the system of the second user, determine a network pathway to quickly and efficiently retrieve this information, and/or pre-fetch this information. In each case, the system may more efficiently (and in less time) obtain relevant information that may inform the second user about potential questions of the first user. Thus, the device interface session between the first and second user may be improved.

At step 502, process 500 (e.g., using one or more components in system 400 (FIG. 4)) receive a first user action during a conversational interaction with a user interface. For example, the system may receive a first user action during a conversational interaction with a user interface. For example, the first user action may comprise a user accessing an on-line feature (e.g., via a mobile application), launching a webpage, and/or logging into a user account.

At step 504, process 500 (e.g., using one or more components in system 400 (FIG. 4)) determines a first feature input for a first machine learning model, a second feature input for a second machine learning model. For example, the system may determine, based on the first user action, a first feature input for a first machine learning model, a second feature input for a second machine learning model, and a third feature input for a third machine learning model, wherein each of the first feature input, the second feature input, and the third features input is based on a respective data source. For example, the first feature input may indicate a webpage, application interface, user device, user account, communication channel, platform (e.g., iOS, Android, Desktop Web, mobile Web), and/or user profile from which the user interface was launched.

In some embodiments, the first machine learning model comprises a first convolutional neural network that is trained on user interface image data. The second machine learning model may perform a classification on the time-dependent user account information. Additionally, the second machine learning model may perform a Weight of Evidence (WOE) analysis on the time-dependent user account information and/or be trained on time-dependent user account information data. The third machine learning model may comprise a second convolutional neural network that is trained on transaction data.

At step 506, process 500 (e.g., using one or more components in system 400 (FIG. 4)) generates a first output from the first machine learning model, a second output from the second machine learning model, and a third output from the third machine learning model. For example, the system may input the first feature input into the first machine learning model, the second feature input into the second machine learning model, and the third feature input into the third machine learning model to generate a first output from the first machine learning model, a second output from the second machine learning model, and a third output from the third machine learning model.

At step 508, process 500 (e.g., using one or more components in system 400 (FIG. 4)) inputs the first output, the second output, and the third output into a fourth machine learning model to generate a fourth output. For example, the system may input the first output, the second output, and the third output into a fourth machine learning model to generate a fourth output. For example, the fourth machine learning model comprises an ensemble function that is trained on outputs of the first machine learning model, the second machine learning model, and the third machine learning model. In some embodiments, the first output is stacked with the second output by the fourth machine learning model.

In some embodiments, the first output may be a multi-label output, and wherein training data for the first machine learning model is multi-class. For example, multi-label classification is a generalization of multiclass classification, which is the single-label problem of categorizing instances into precisely one of more than two classes. For example, the system's multi-label problem may have no constraint on how many of the classes the instance can be assigned to. The training data may be multi-class. For example, the systems training data may have one or more classes. In some embodiments, the first machine learning model may be a single multi-class convolutional neural network or a binary classification, and the first output of the first machine learning model may be a multi-value vector of probabilities, wherein each of the values (e.g., between one and one-hundred) in the multi-value vector corresponds to a given user intent.

At step 510, process 500 (e.g., using one or more components in system 400 (FIG. 4)) determines an aggregate measure of performance across all possible classification thresholds for models. For example, the system may determine an aggregate measure of performance across all possible classification thresholds for the first machine learning model, the second machine learning model, the third machine learning model, and the fourth machine learning model.

At step 512, process 500 (e.g., using one or more components in system 400 (FIG. 4)) determines that the fourth machine learning model has the highest aggregate measure of performance. For example, the system may determine that the fourth machine learning model has the highest aggregate measure of performance. In some embodiments, the system may also replace low performing machine learning models. For example, in response to determining that the first machine learning model has the lowest aggregate measure of performance, the system may replace the first machine learning model with a fifth machine learning model.

For example, each of the ensemble members (e.g., the first, second and/or third machine learning models) may generate N-number of predictions (e.g., which may correspond to a predetermined number) for N-number intents (e.g., which may correspond to a predetermined number). For example, the N-number of intents may correspond to 10, 50, 51, 100, or 1000 intents, The system may use two ensemble members, e.g., a first machine learning model that is a CNN and a second machine learning model that uses XGBoost. XGBoost is an optimized distributed gradient boosting library designed to be highly efficient, flexible and portable. It implements machine learning algorithms under the Gradient Boosting framework. XGBoost provides a parallel tree boosting (also known as GBDT, GBM) that solves problems in a fast and accurate way.

The system may then produce twice the N-number of predictions (e.g., one pair (2) per intent). The system may then process these N-number of pairs and create a prediction for each of the N-number of intents during the model training.

Based on training results, the system determines, that for most of the intents, its ensemble prediction (e.g., the prediction of the fourth machine learning model) is better than each of the individual members (e.g., the predication of the first, second, etc. machine learning models). If the ensemble prediction is better, the system will use it. Alternatively, (and likely in rare cases) for a particular intent, the system may determine that a member's prediction is better than the ensemble's prediction based on its training. Accordingly, in making prediction (e.g., an inference), the system uses the ensemble prediction except for in rare cases as described above, it uses the prediction from the member instead i.e. bypassing the ensemble prediction (e.g., the fourth machine learning model).

At step 514, process 500 (e.g., using one or more components in system 400 (FIG. 4)) selects the fourth output for use in generating a dynamic conversational response from a plurality of dynamic conversational responses. For example, the system may select the fourth output for use in generating a dynamic conversational response from a plurality of dynamic conversational responses in response to determining that the fourth machine learning model has the highest aggregate measure of performance.

At step 516, process 500 (e.g., using one or more components in system 400 (FIG. 4)) generates the dynamic conversational response during the conversational interaction. For example, the system may generate, at the user interface, the dynamic conversational response during the conversational interaction. For example, FIG. 1 may generate response 102 (FIG. 1) based on the fourth output.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses using ensemble prediction based on a plurality of machine learning models, the method comprising: receiving a first user action during a conversational interaction with a user interface; determining, based on the first user action, a first feature input for a first machine learning model, a second feature input for a second machine learning model, and a third feature input for a third machine learning model, wherein each of the first feature input, the second feature input, and the third features input is based on a respective data source; inputting the first feature input into the first machine learning model, the second feature input into the second machine learning model, and the third feature input into the third machine learning model to generate a first output from the first machine learning model, a second output from the second machine learning model, and a third output from the third machine learning model; inputting the first output, the second output, and the third output into a fourth machine learning model to generate a fourth output; determining an aggregate measure of performance across all possible classification thresholds for the first machine learning model, the second machine learning model, the third machine learning model, and the fourth machine learning model; determining that the fourth machine learning model has the highest aggregate measure of performance; in response to determining that the fourth machine learning model has the highest aggregate measure of performance, selecting the fourth output for use in generating a dynamic conversational response from a plurality of dynamic conversational responses; and generating, at the user interface, the dynamic conversational response during the conversational interaction.
2. The method of embodiment 2, wherein the first machine learning model comprises a first convolutional neural network that is trained on user interface image data.
3. The method of any one of embodiments 1-2, wherein the second machine learning model performs a Weight of Evidence (WOE) analysis and is trained on time-dependent user account information data.
4. The method of any one of embodiments 1-3, wherein the third machine learning model comprises a second convolutional neural network that is trained on transaction data.
5. The method of any one of embodiments 1-4, wherein the fourth machine learning model comprises an ensemble function that is trained on outputs of the first machine learning model, the second machine learning model, and the third machine learning model.
6. The method of any one of embodiments 1-5, further comprising:
   in response to determining that the first machine learning model has the lowest the aggregate measure of performance, replacing the first machine learning model with a fifth machine learning model.
7. The method of any one of embodiments 1-6, wherein the first output is multi-label, and wherein training data for the first machine learning model is multi-class.
8. The method of any one of embodiments 1-7, wherein the first machine learning model is a single multi-class convolutional neural network, and wherein the first output of the first machine learning model is a multi-value vector of probabilities, and wherein each of the values in the multi-value vector corresponds to a given user intent.
9. The method of embodiment 8, wherein the first output is stacked with the second output by the fourth machine learning model.
10. The method of any one of embodiments 1-9, wherein the first feature input indicates an application interface from which the user interface was launched.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.

What is claimed is:

1. A system for generating dynamic conversational responses using ensemble prediction based on a plurality of machine learning models, the system comprising:
   storage circuitry configured to store:
      a first machine learning model that is trained on user interface image data;
      a second machine learning model that is trained on Weight of Evidence (WOE) data;
      a third machine learning model that is trained on transaction data;
      a fourth machine learning model, wherein the fourth machine learning model comprises an ensemble function that is trained on outputs of the first machine learning model, the second machine learning model, and the third machine learning model; and
   control circuitry configured to:
      receive a first user action related to a conversational interaction with a user interface;
      determine, based on the first user action, a first feature input for the first machine learning model, a second feature input for the second machine learning model, and a third feature input for the third machine learning model;

input the first feature input into the first machine learning model, the second feature input into the second machine learning model, and the third feature input into the third machine learning model to generate a first output from the first machine learning model, a second output from the second machine learning model, and a third output from the third machine learning model;

input the first output, the second output, and the third output into the fourth machine learning model to generate a fourth output for use in generating a dynamic conversational response; and input/output circuitry configured to:
generate for display, at the user interface, the dynamic conversational response for the conversational interaction.

2. A method for generating dynamic conversational responses using ensemble prediction based on a plurality of machine learning models, the method comprising:

receiving a first user action related to a conversational interaction;

determining, based on the first user action a first feature input for a first machine learning model, a second feature input for a second machine learning model, and a third feature input for a third machine learning model, wherein the first machine learning model is trained on user interface image data, the second machine learning model is trained on Weight of Evidence (WOE) data, the third machine learning model is trained on transaction data, a fourth machine learning model comprising an ensemble function that is trained on outputs of the first machine learning model, the second machine learning model, and the third machine learning model, and wherein each of the first feature input, the second feature input, and the third feature input is based on a respective data source;

inputting the first feature input into the first machine learning model, the second feature input into the second machine learning model, and the third feature input into the third machine learning model to generate a first output from the first machine learning model, a second output from the second machine learning model, and a third output from the third machine learning model;

inputting the first output, the second output, and the third output into the fourth machine learning model to generate a fourth output for use in generating a dynamic conversational response; and generating for display, the dynamic conversational response for the conversational interaction.

3. The method of claim 2, wherein the first machine learning model comprises a first convolutional neural network.

4. The method of claim 2, wherein the second machine learning model performs a Weight of Evidence (WOE) analysis.

5. The method of claim 2, wherein the third machine learning model comprises a second convolutional neural network.

6. The method of claim 2, further comprising:
determining an aggregate measure of performance across all possible classification thresholds for the first machine learning model, the second machine learning model, the third machine learning model, and the fourth machine learning model;

determining which machine learning model of the first, second, third, and fourth machine learning model has the highest aggregate measure of performance; and selecting the output of the first, second, third, or fourth machine learning model having the highest aggregate measure of performance for use in generating the dynamic conversational response from the plurality of dynamic conversational responses in lieu of the output of the fourth machine learning model.

7. The method of claim 6, further comprising:
in response to determining that the first machine learning model has the lowest aggregate measure of performance, replacing the first machine learning model with a fifth machine learning model.

8. The method of claim 2, wherein the first output is multi-label, and wherein training data for the first machine learning model is multi-class.

9. The method of claim 2, wherein the first machine learning model is a single multi-class convolutional neural network, wherein the first output of the first machine learning model is a multi-value vector of probabilities, and wherein each value in the multi-value vector corresponds to a given user intent.

10. The method of claim 9, wherein the first output is stacked with the second output by the fourth machine learning model.

11. The method of claim 2, wherein the first feature input indicates an application interface from which a user interface was launched.

12. One or more non-transitory computer-readable media comprising of instructions that, when executed by one or more processors, cause operations comprising:

receiving a first user action related to a conversational interaction;

determining, based on the first user action, a first feature input for a first machine learning model, a second feature input for a second machine learning model, and a third feature input for a third machine learning model, wherein the first machine learning model is trained on user interface image data, the second machine learning model is trained on Weight of Evidence (WOE) data, the third machine learning model is trained on transaction data, a fourth machine learning model comprising an ensemble function that is trained on outputs of the first machine learning model, the second machine learning model, and the third machine learning model, and wherein each of the first feature input, the second feature input, and the third feature input is based on a respective data source;

inputting the first feature input into the first machine learning model, the second feature input into the second machine learning model, and the third feature input into the third machine learning model to generate a first output from the first machine learning model, a second output from the second machine learning model, and a third output from the third machine learning model;

inputting the first output, the second output, and the third output into the fourth machine learning model to generate a fourth output for use in generating a dynamic conversational response; and generating for display, the dynamic conversational response for the conversational interaction.

13. The one or more non-transitory computer-readable media of claim 12, wherein the first machine learning model comprises a first convolutional neural network.

14. The one or more non-transitory computer-readable media of claim 12, wherein the second machine learning model performs a Weight of Evidence (WOE) analysis.

15. The one or more non-transitory computer-readable media of claim 12, wherein the third machine learning model comprises a second convolutional neural network.

16. The one or more non-transitory computer-readable media of claim 12, wherein the instructions further comprise:
   determining an aggregate measure of performance across all possible classification thresholds for the first machine learning model, the second machine learning model, the third machine learning model, and the fourth machine learning model;
   determining which machine learning model of the first, second, third, and fourth machine learning model has the highest aggregate measure of performance; and
   selecting the output of the first, second, third, or fourth machine learning model having the highest aggregate measure of performance for use in generating the dynamic conversational response from the plurality of dynamic conversational responses in lieu of the output of the fourth machine learning model.

17. The one or more non-transitory computer-readable media of claim 16, wherein the instructions further cause operations comprising replacing the first machine learning model with a fifth machine learning model in response to determining that the first machine learning model has the lowest the aggregate measure of performance.

18. The one or more non-transitory computer-readable media of claim 12, wherein the first output is multi-label, and wherein a training data for the first machine learning model is multi-class.

19. The one or more non-transitory computer-readable media of claim 12, wherein the first machine learning model is a single multi-class convolutional neural network, wherein the first output of the first machine learning model is a multi-value vector of probabilities, and wherein each value in the multi-value vector corresponds to a given user intent.

20. The one or more non-transitory computer-readable media of claim 19, wherein the first output is stacked with the second output by the fourth machine learning model.

\* \* \* \* \*